United States Patent Office 3,352,203
Patented Nov. 14, 1967

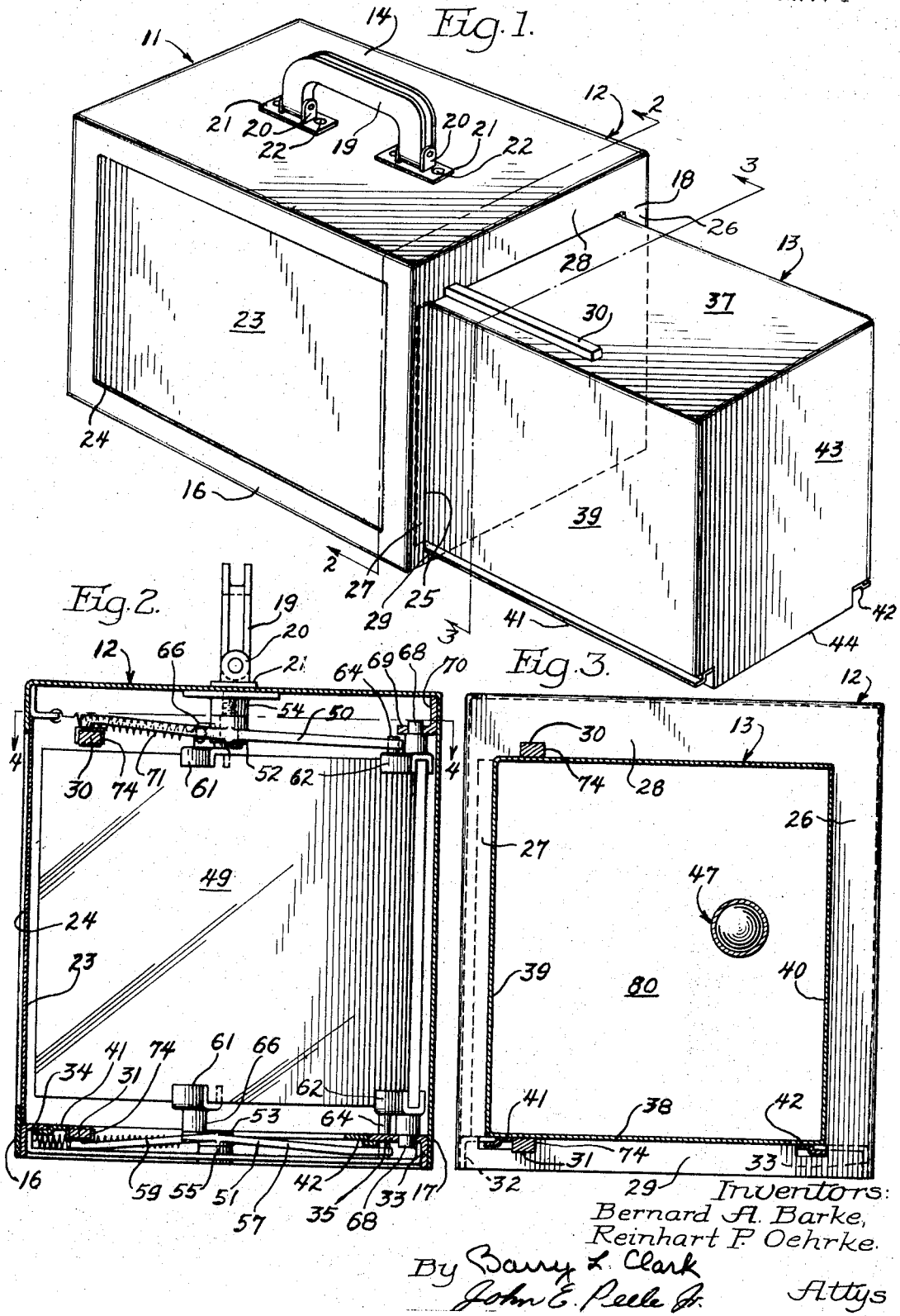

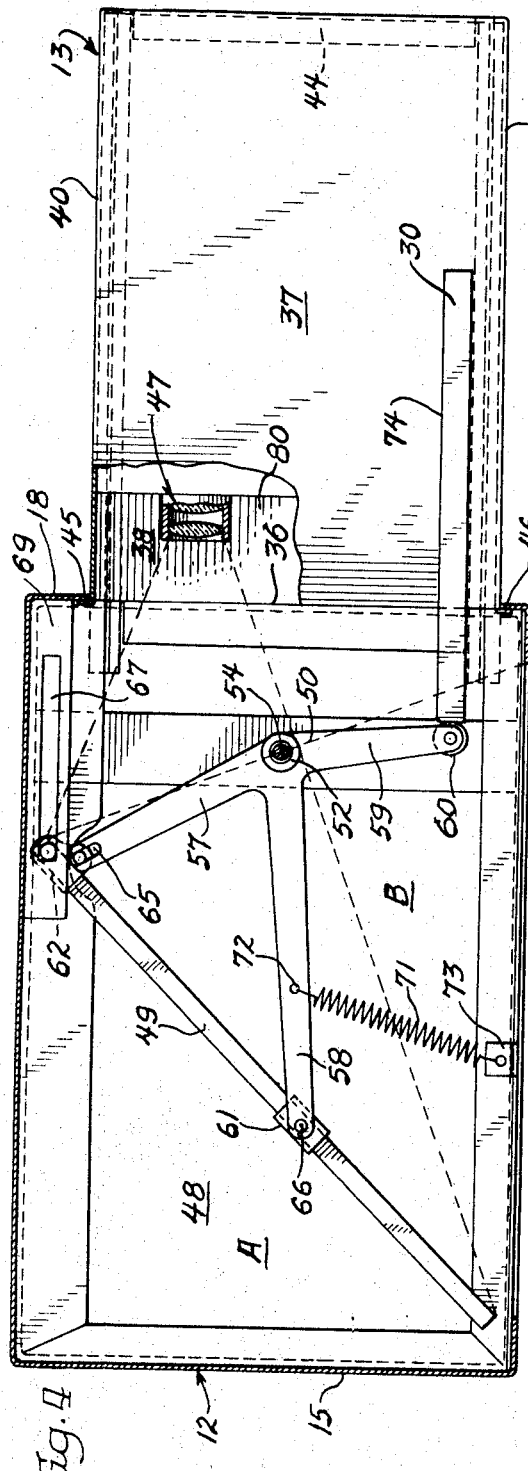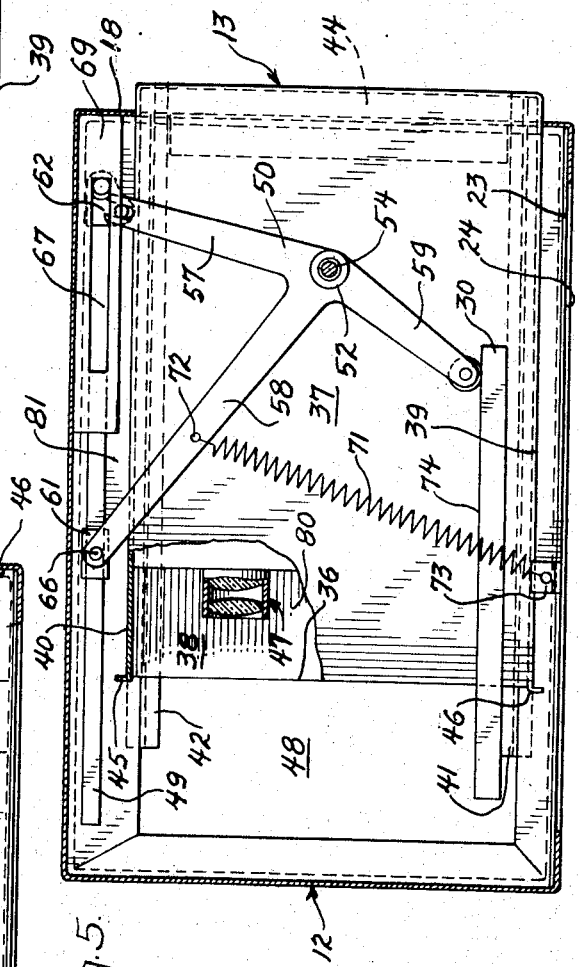

3,352,203
SELF-STORING REAR SCREEN PROJECTOR
Bernard A. Barke, Skokie, and Reinhart P. Oehrke, Chicago, Ill., assignors to Bell & Howell Company, Chicago, Ill., a corporation of Illinois
Filed Oct. 24, 1965, Ser. No. 504,357
10 Claims. (Cl. 88—24)

The present invention relates generally to film projecting apparatus. Particularly the invention relates to a portable film projector assembly comprising an expandable casing having a pair of sections in which a film projector and a reflector are mounted, respectively, for directing an image upon a viewing screen which the casing is adapted to support.

Essentially, assemblies of the class with which the instant invention is concerned fall into two categories, namely, that in which each device is adapted to exhibit in a plane which is disposed transversely of the potical axis of its projector, and that in which each device is adapted for exhibiting in a plane parallel to the optical axis of its projector. Assemblies of the former category are exemplified by U.S. Patents 2,231,395, 2,322,023 and 2,361,398. Assemblies of the latter category are exemplified by U.S. Patents 2,032,116, 3,185,027 and 3,195,401. Assemblies of both categories include reflectors which are supported in planes intersecting the optical axes of their projectors.

While compacting a projector casing in an assembly of the former category may not be appreciably limited by its reflector, in devices of the latter category, compacting of projector casings is limited because of the blocking angular disposition required to be assumed by the reflectors of the assemblies relative to their projectors for effective image transmission to viewing screens. That is to say, in devices of the latter category, space requirement of their reflectors are such that upon casing contraction bulkiness remains which, except for reflector slope, could be minimized.

It is among the objects of the present invention to provide an improved projection cabinet containing an optical projector and a mirror for reflection of a projected image upon a translucent viewing screen for which the assembly is adapted to provide means of support.

It is additionally an object of the invention to provide in such assembly improved means for removing the mirror from its operative attitude (which is in a plane intersecting the optical axis of the projector) to permit the projector to be moved into an expanse normally occupied by said mirror when it is operably conditioned for reflection upon a viewing screen.

In particular it is an object of the invention to provide a telescopic box or container for a film projector having a pair of relatively slidable parts, one of which serves as a mount for an optical projector and the other of which serves as a mount for a mirror, the mirror arranged for rocking movement into and out of projector image reflecting attitude whereby the projector may be moved into the space normally occupied by said mirror during its normal image reflecting operation to permit compacting of said box or container.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:
FIG. 1 is a perspective view of one embodiment of the present invention, the casing comprising the projector and the reflector mounts being conditioned for projector operation.

FIG. 2 is a vertical sectional view taken substantially on the line 2—2 of FIG. 1 and looking in the direction of the arrows, the reflector being shown in elevation.

FIG. 3 is a vertical sectional view taken substantially on the line 3—3 of FIG. 1 and looking in the direction of the arrows, all the parts of the projector having been omitted with the exception of the lens barrel and lens assembly mounted therein.

FIG. 4 is a horizontal sectional view taken substantially on the line 4—4 of FIG. 2 and looking in the direction of the arrows.

FIG. 5 is a horizontal sectional view in the same plane as FIG. 4, however showing the casing collapsed or compacted in portable condition.

Referring now more particularly to FIG. 1 it is seen that the device comprises a case generally designated by the numeral 11. The case has a pair of telescopically arranged sections 12 and 13, the outer thereof 12 being a mirror mount and the inner thereof 13 being an optical projector mount. The telescopic arrangement permits relative sliding of the case sections, the maximum expanded condition of said case being shown in FIGS. 1 and 4 and the most compacted condition thereof illustrated in FIG. 5.

The mirror mount section 12 is a rectangular box-like construction which comprises an upper wall 14, what may be considered a forward end wall 15, a pair of parallel side panels 16 and 17 and what may be considered a rear panel 18 which is parallel to the forward end wall 15.

As illustrated in FIG. 1, the mirror mount section 12 has secured to its upper wall 14 a handle assembly 19 which is rockable in a pair of opposed brackets 20 carried on or fashioned with mounting plates or bosses 21. The latter are suitably secured to said top wall 14 by means of conventional fasteners 22 such as rivets or the like to anchor assembly 19 whereby case 11 may be carried.

As illustrated in FIGS. 1, 2, 4 and 5 the side panel 16 has an enlarged rectangular opening 24 across which there is mounted a translucent viewing screen 23 from the outer surface of which images reflected within the mirror mount section 12 are visible in a manner which will become evident hereinafter. As illustrated in FIG. 1, the area of the opening 24 preferably occupies substantially the entire side 16 leaving a screen marginal part proportioned just large enough to support the viewing screen through its perimeter.

The rear panel 18 of the mirror mount section 12 has an enlarged rectangular opening 25 which is bounded by a pair of opposed parallel side marginal portions 26 and 27, an upper marginal portion 28 and a lower marginal portion 29. The upper and lower marginal portions 28 and 29 are slotted to accommodate sliding movement of a pair of upper and lower camming rods or bars 30 and 31 which are adapted for relative movement inwardly and outwardly of the mirror mount section 12 in a manner which will be more readily apparent hereinafter.

As illustrated in FIGS. 2 and 3 a pair of elongated angle bars 32 and 33 have vertical sections which are secured to the lower margins of the panels 16 and 17. The angle bars extend longitudinally of the mirror mount section 12 and have horizontal inward extensions 34 and 35, respectively, which serve as sliding supports for opposite sides of the projector mount section 13.

The projector mount section 13 is a rectangular box-like construction smaller than the construction defining mirror mount section 12. Projector mount section 13 has an open front end 36, as illustrated in FIGS. 4 and 5, a top panel 37, a floor 38 and a pair of side panels 39 and 40. The opening 25 in the rear panel 18 of the mirror mount section 12 is dimensioned just large enough to accommodate relative in and out sliding movements of the projector mount section 13 with respect to said mirror mount section. To that end, the opposite sides of the floor 38 of the projector mount section 13 are slidably mounted on the angle bar extensions 34 and 35 heretofore defined. The extensions 34 and 35 engage in a pair of opposed tracks generated by opposed elongated offset members 41 and 42 which are carried on opposite sides of said floor 38, as illustrated in FIGS. 1, 2 and 3. By reason of the foregoing construction, the case sections 12 and 13 are manageable for telescopic sliding relative to each other.

The floor 38 provides a support on which any suitable optical projector generally designated 47 may be mounted within the chamber 80 defined within said projector mount. The projector is represented in the drawings by its forward lens barrel and a lens assembly, substantially all of the remainder of the structural details of said projector being omitted as such details of construction are not intended as limiting on the present invention. In this regard it will be appreciated that the optical projector may be either of the motion picture or slide transparency type with its lens barrel arranged in a manner adapted to project light through front opening 36 of the projector mount section 13 into the chamber 48 formed within the mirror mount section 12.

Because the projector is mounted in section 13 that case section will be the heavier of the case sections. Therefore, in practice, when the sections 12 and 13 are moved relatively, either to expand or contract the case 11, it will be section 12 which moves, section 13 remaining fixed or stationary. As illustrated in FIG. 1, to anchor section 13, its rear panel 43 has a foot or depending extension 44 adapted to engage a base on which said case 11 may be supported. Moreover, extension 44 also serves to limit relative closure of the case sections 12 and 13 by engagement with the bottom marginal part 29 of the rear panel 18 of mirror mount section 12, as illustrated in FIGS. 1, 4 and 5.

To preclude pulling apart of the sections 12 and 13, the side panels 39 and 40 of case section 13 have retainer strips 46 and 45 which may be fashioned integrally with said side panels at the forward ends thereof in a manner such that they spread outwardly a distance wider than the opening 25. Accordingly, separation of said case sections will be limited by engagement of said strips 46 and 45 with the front end of case section 13, as illustrated in FIG. 4.

A reflector or mirror 49 is rockably supported within the chamber 48, said mirror is adapted for conditioning for image projection onto the screen 23, and when thusly arranged said mirror is disposed with said screen and the optical axis of the projector 47 to which said screen is parallel at an angle of about 45°. Such disposition is illustrated in FIGS. 2 and 4, in FIG. 4 of which it is seen that the mirror thusly conditioned divides the chamber 48 into two chamber sections A and B. It will be appreciated that by maintaining the mirror 49 at such angular disposition compacting of the case 11 would be limited by engagement of the lead or front end of the projector mount section 13 with the mirror. Because such arrangmeent would be undesirable, means, the description of which ensues hereafter, are provided for rocking the mirror 49 from its position of FIG. 4 to the position of FIG. 5 as the case sections 12 and 13 are telescopically moved together.

As illustrated in FIGS. 2, 4 and 5, the mirror 49 is supported by a pair of substantially identical upper and lower mirror holders 50 and 51. Said holders have hubs or center portions 52 and 53, respectively, which are arranged for rocking movement about a pair of vertically aligned pivots 54 and 55. Said pivots are fixed, respectively, to the upper wall 14 and a bottom member 56 of the mirror mount section 12, as illustrated in FIG. 2.

Each of the mirror holders 50 and 51 is fashioned with a plurality of radiating arms 57, 58 and 59 projected from their respective hubs in a manner clearly illustrated in FIGS. 4 and 5 in which only the upper mirror holder 50 is shown. The arms 57 and 58 of each mirror holder are disposed at an angle of approximately 60° from each other; and such arms 57 and 58, through holding elements to be subsequently described, hold one side and a medial part of said mirror along an adjoining upper or lower edge. The third arm 59 of each of the mirror holders is disposed at an angle of approximately 100° from its associated arm 58 toward one side of case 11. In its outer end each arm 59 has journalled a roller or cam follower 60 which is arranged in a manner such that, when the case sections 12 and 13 are conditioned for picture projection, the upper cam follower 60 will be disposed adjacent and in the path of movement of the forward end of the upper camming bar or rod 30 and the lower cam follower 60 will be disposed adjacent and in the path of movement of the forward end of the lower camming bar or rod 31.

The holding elements comprising the medial mirror holders are a pair of channel shaped mirror gripping members 61 proportioned to rigidly engage the mirror from opposite faces. Each gripping member 61 has an outward projection 66 operably connected in the outer end of its respective arm 58 for pivoting.

A pair of like shaped holding elements comprising gripping members 62 secure the top and bottom of the mirror adjacent mirror side 63. The mirror gripping members 62 are each fashioned with a pin or boss 64 which is arranged for sliding and pivoting movement in a lost motion slot 65 formed in the outer end of a respective of the arms 57.

Each of the gripping members 62 also is fashioned with an additional pin or extension 68 which engages in an elongated slot 67 arranged in front to rear disposition. The lower slot 67 is formed in the horizontal extension 35 of the angle bar 33, as illustrated to the right of FIG. 2, said lower slot 67 being disposed between the side panel 17 and the slide 42. The upper slot 67 is disposed in vertical alignment with the lower thereof but formed in the horizontal extension 69 of an elongated angle bar 70 the vertical portion of which is secured by suitable means to the upper part of side panel 17, as illustrated in FIGS. 2, 4 and 5.

In the illustrated embodiment, mirror 49 is biased toward its operative condition, being the position of FIG. 4. The biasing means comprise a pair of substantially identical upper and lower expansion springs 71. One end of each spring is anchored in a medial portion of a corresponding arm 58 as at 72. The opposite ends of said springs are connected to the upper and lower marginal parts of the panel 16 by means of anchoring brackets 73. The springs 71 serve to maintain the mirror in proper angular disposition for image reflection on screen 23 when it is desired that the device be conditioned for exhibiting.

By reason of the foregoing construction, when it is desired to compact case 11, its sections may be manually urged toward each other. Normally, the mirror mount section 12 will yield first because it is lighter in weight and accordingly will move about the section 13, that is to the right with respect to FIG. 4. As relative closure of the case sections 12 and 13 occurs, the cam followers 60 will be forced to the sides 74 of the camming rods or bars 30 and 31 thereby shifting the mirror with such shifting movement in part being accommodated by the lost motion slots 65. Simultaneously the mirror holders 50 and 51 will be rocked clockwise with respect to FIGS. 4 and 5 under the camming action resulting as the cam followers 60 ride along the sides 74 of camming rods or bars 30 and 31. Such clockwise movement shifts the mirror 49 to the side of the relatively inwardly moving projector mount section 13 opposite the side on which cam followers 60 are disposed into a chamber 81 which is gradually generated between casing section sides 17 and 40 as the casing 11 contracts to thereby condition said mirror 49 as illustrated in FIG. 5. By thus conditioning the mirror, the chamber section A now merges with the chamber section B, the obstruction in the chamber 48 having been removed whereby the projection mount section 13 is free to occupy a substantial portion of the chamber section A theretofore blocked by the mirror from penetration by said projector mount section 13.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In a film exhibiting device having a pair of casing sections adapted for relative in and out movement, an optical projector mounted in a first casing section, said first casing section having an end opening for projection of light therethrough along the optical axis of said projector, a mirror movably mounted in the other casing section and adapted for disposition in image receiving relationship with said projector, means for supporting a screen for impingement thereon of an image reflected from said mirror when it is conditioned for image reception, and mirror displacement means operative upon relative movement of said casing sections to shift said mirror out of and into intersecting relationship with the optical axis of said projector whereby said first casing section can be removably positioned in the space in the other casing section occupied by the mirror while it is operatively conditioned.

2. A film exhibiting device substantially as defined in claim 1 in which the mirror displacement means comprises rockable mirror holder means pivotally supporting said mirror for shifting in the other casing section, and mirror holder impeller means mounted for actuation with the first casing section to reversibly rock said mirror holder means as said casing sections move relatively inwardly and outwardly.

3. A film exhibiting device substantially as defined in claim 2 in which the impeller means is connected to said first section for movement inwardly and outwardly as said sections move relatively correspondingly and operably connected to said mirror holder and being further characterized by spring biasing means for urging said mirror to image reception condition against a force tending to move said casing sections relatively inwardly.

4. A film exhibiting device substantially as defined in claim 2 in which the rockable mirror holder means comprises a pair of pivoted mirror holding members securing said mirror on opposed sides and proportional for engagement with said impeller means, said impeller means constrained for relative movement with said first casing section, and having axis defined means about which said mirror is rockable and disposed in intersecting relationship with the path of relative in and out casing section movement.

5. A film exhibiting device substantially as defined in claim 2 in which the impeller means comprises a pair of camming bars carried by the first casing section and extending longitudinally of the path of in and out casing section movement, said rockable mirror holder means comprising a pair of opposed mirror holding members gripping said mirror from opposite sides and rockable about an axis intersecting the path of relative in and out casing section movement, said mirror holder means including a pair of cam followers in operable engagement with said camming bars for shifting said mirror out of and into image reflecting attitude as said sections move relatively inwardly and outwardly.

6. A film exhibiting device as defined in claim 1 in which the mirror displacement means comprises a pair of opposed axially aligned mirror rocking members arranged transversely of the path of in and out casing section movement and gripping the mirror in opposed positions, cam follower means constrained for rocking with said mirror rocking members and cam means constrained for movement with the first casing section and engaging said cam follower means to condition said mirror in and out of the path of relative casing section movement as said casing sections are moved relatively outwardly and inwardly.

7. In a film exhibiting assembly comprising a casing having a pair of telescopically arranged inner and outer casing sections adapted for movement relative to each other to extend and contract said casing, said sections when disposed in contracted condition defining therebetween a chamber, an optical projector fixed in the inner casing section, said sections having end openings for passage of light projected along the optical axis of said projector, a mirror rockably mounted in the outer casing section and adapted for operably conditioning in intersecting relationship with the optical axis of said projector, mirror holding means for rocking said mirror into and out of operable condition, means for supporting a screen in reflection receiving attitude with said mirror when it is operably conditioned, a cam mechanism secured to the inner casing section for reversibly rocking said mirror holding means as said casing sections are moved relatively outwardly and inwardly to respectively rock said mirror toward operable condition and into said chamber.

8. In a film exhibiting device comprising a case having a pair of inner and outer casing sections arranged for relative sliding movement to contract and expand said case, said sections proportioned and arranged to gradually generate between the walls thereof a chamber as said case is contracted; an optical projector secured in the inner casing section, said inner casing section having an end opening for projection of light therethrough along the optical axis of said projector; a mirror movably mounted in said outer section and adapted for disposition in and out of operable attitude, said mirror when operably conditioned being disposed transversely of the optical axis of said projector for image reception; mounting means on said outer casing section for holding a screen in a plane parallel to the optical axis of the projector in reflection receiving attitude with said mirror when it is operably conditioned; mirror rocking means arranged for support of said mirror along top and bottom sides; pivot means defining an axis transverse to the path of relative movement of said casing sections and about which said mirror is movable; cam means including an impellent part engaging said mirror rocking means and carried with said inner casing section to move said mirror into and out of said chamber as said casing contracts and expands, and control means for guiding the path of movement of said mirror into and out of said chamber.

9. A film exhibiting device substantially as defined in claim 8 further characterized by a cam follower constrained for movement with said mirror rocking means, ing an inner end against which said cam follower is engaged when said casing is fully extended, spring means biassing said mirror into operative condition when said case is fully extended and means to shift said cam follower over the inner end of said cam bar for sliding longitudinally thereof as said case is contracted to rock said mirror rocking means.

10. In a film exhibiting device, the combination of an outer casing section with an end opening, an inner casing section having a light transmission opening and arranged for in and out movement relative to the outer casing section through the end opening in said outer casing section; an optical projector mounted in said inner section for projection of light through the light transmission opening of said inner casing section into said outer casing section along the optical axis of said projector, a mirror mounted in the outer casing section in image receiving relationship with said projector in the path of relative inward movement of said inner casing section and means for supporting an image reproducing screen in reflection receiving relationship with said mirror, with mirror shifting means for rocking said mirror out of the path of the path of relative inward movement of said inner casing section, and impeller means connected to said mirror shifting means and operative to rock said mirror as said casing sections are moved relatively together to unblock the path of the inner casing section upon relative inward movement thereof.

References Cited

UNITED STATES PATENTS

| | | | |
|---|---|---|---|
| 2,685,817 | 8/1954 | Freeman | 88—24 |
| 3,185,027 | 5/1965 | Hodges et al. | 88—24 |
| 3,195,401 | 7/1965 | Lange | 88—24 |

NORTON ANSHER, *Primary Examiner.*

WYNDHAM M. FRYE, *Examiner.*